United States Patent [19]

Gerson et al.

[11] Patent Number: 4,751,737
[45] Date of Patent: Jun. 14, 1988

[54] TEMPLATE GENERATION METHOD IN A SPEECH RECOGNITION SYSTEM

[75] Inventors: Ira A. Gerson, Hoffman Estates; Brett L. Lindsley, Schaumburg, both of Ill.

[73] Assignee: Motorola Inc., Schaumburg, Ill.

[21] Appl. No.: 795,562

[22] Filed: Nov. 6, 1985

[51] Int. Cl.$^4$ .............................................. G10L 1/00
[52] U.S. Cl. ....................................... 381/43; 381/41; 381/42; 364/513.5
[58] Field of Search ....................... 381/41, 42, 43, 44, 381/45, 46, 50, 51, 36, 39; 364/513.5, 521, 410, 487, 513; 340/825.23; 379/88, 89, 199, 354, 355

[56] References Cited

U.S. PATENT DOCUMENTS

| | | | |
|---|---|---|---|
| 3,582,559 | 6/1971 | Hitchcock | 381/43 |
| 4,181,821 | 1/1980 | Pirz et al. | 381/43 |
| 4,348,550 | 9/1982 | Pirz et al. | 381/43 X |
| 4,349,700 | 9/1982 | Pirz et al. | 364/513.5 |
| 4,363,102 | 12/1982 | Holmgren et al. | 381/42 X |
| 4,454,586 | 6/1984 | Pirz et al. | 381/41 X |
| 4,467,437 | 8/1984 | Tsuruta et al. | 381/43 X |
| 4,488,243 | 12/1984 | Brown et al. | 364/513.5 |
| 4,528,688 | 7/1985 | Ichikawa et al. | 381/43 |
| 4,570,232 | 2/1986 | Shikano | 381/43 X |
| 4,571,697 | 2/1986 | Watanabe | 381/43 X |
| 4,596,031 | 6/1986 | Hakaridani et al. | 381/43 |

OTHER PUBLICATIONS

"On Creating Averaging Methods," by Y. J. Liu, ICASSP 1984, pp. 9.1.1 through 9.1.4.
"A Modification Over Sakoe and Chiba's Dynamic Time Warpig Algorithm for Isolated Word Recognition," by Paliwal, Agarwal and Sinha, ICASSP 1982, pp. 1259-1261.
"Dynamic Programming Algorithm Optimization for Spoken Word Recognition," by Hiroaki Sakoe and Seibi Chiba, ASSP, vol. 26, No. 1, Feb. 1978.
"Minimum Prediction Residual Principle Applied to Speech Recognition," by F. Itakura, IEEE Transactions on Acoustics, Speech, and Signal Processing, vol. ASSP-23, Feb., 1975, pp. 67-72.
"An Improved Endpoint Detector for Isolated Word Recognition," by L. F. Lamel, L. R. Rabiner, A. E. Rosenburg and J. G. Wilpon, IEEE Transactions on Acoustics, Speech, and Signal Processing, vol. ASSP-29, Aug., 1981, pp. 777-785.
"Speech Recognition Experiments with Linear Prediction, Bandpass Filtering, and Dynamic Programming," by G. M. White and R. B. Neely, IEEE Transactions on Acoustics, Speech, and Signal Processing, vol. ASSP-24, Apr., 1976, pp. 183-188.
"Firmware-Programmable $_u$C Aids Speech Recognition," by Tom Schalk and Michael McMahan, Electronic Design, Jul. 2, 1982, pp. 143-147.
"A Simplified, Robust Training Procedure for Speaker Trained, Isolated Word Recognition Systems," by L. R. Rabiner and J. G. Wilpon, J. Acoust. Soc. Am., vol. 68, No. 5, Nov., 1980, pp. 1271-1276.
"A Real-Time Hardware Continuous Speech Recognition System," by J. B. Peckham, I. R. D. Green, J. V. Canning and P. Stephens, Proceedings 1982 IEEE Int. Conference on Acoustics, Speech and Signal Processing, pp. 863-866.
"An Algorithm for Connected Word Recognition," by J. Bridle, M. Brown and R. Chamberlain, Proceedings 1982 IEEE Int. Conference on Acoustics, Speech and Signal Processing, pp. 899-902.

Primary Examiner—William M. Shoop, Jr.
Assistant Examiner—Paul Ip
Attorney, Agent, or Firm—Robert J. Crawford

[57] ABSTRACT

Disclosed is a method for generating word templates for a speech recognition system. It is used where speech is represented by data in frames of equal time intervals. The method includes generating an interim template, generating a time alignment path between the interim template and a token, mapping frames from the interim template and the token along the time alignment path onto an averaged time axis, and combining data associated with the mapped frames to produce composite frames representative of the final word template. The method realizes advantages of reduced memory usage and a realistic data average from each contributing averaged word.

29 Claims, 5 Drawing Sheets

TEMPLATE GENERATION METHOD IN A SPEECH RECOGNITION SYSTEM

BACKGROUND OF THE INVENTION

The present invention relates to the practice of generating reliable word templates from speech utterances for a speech recognition system and, more particularly, to the practice of generating reliable word templates by averaging repetitious speech during word training for a user dependent speech recognition system.

A typical method of word template generation is to use a single utterance of a given word as the word template. This has been known to cause problems due to the fluctuation in which words are spoken by the user of the system. Words can be distorted by the speed in which they are spoken as well as by physical irregularities in the speaker's voice. For example, a word will distort when the user has a cold or when the user's lips smack.

Another typical method of word template generation is to use multiple training utterances stored as individual templates for a given word. Although this method can realize good accuracy in matching spoken words to the prestored word templates, it may be impractical due to the excessive computation time and extensive memory it requires.

Because of problems related to these methods, there has been a number of word template generation schemes developed which use the concept of averaging spoken words during voice training. Words spoken for training are referred to as tokens. Although the word "token" implies a single spoken word, a "token" can merely represent a short phrase. The goal in averaging tokens in a word template generation scheme is to generate a word template which best typifies the word as spoken by the speech recognition system user. Prior art methods which average training tokens generate the word template from tokens which disproportionately contribute to the resultant word template.

In a paper by Y. J. Liu, entitled "On Creating Averaging Methods", ICASSP 1984 pp. 9.1.1 through 9.1.4, described are a few techniques for generating templates by averaging. The first technique is called 'Dynamic Averaging'. The first requirement in this technique is to choose a token 'whose length is representative'. Subsequent tokens are averaged into this chosen token, each mapped to the 'representative length'. The disadvantage of this technique is twofold. The first disadvantage is that if one of the tokens is not of a similar length, mapping its length onto a time axis of a chosen does not allow the token to contribute to the averaged token with respect to length. If the token is at all representative of the spoken word, it should be averaged in data and length. If the token is not representative of the spoken word, it should not be averaged at all.

The second disadvantage of this technique is that the resultant word template is dependent on the order in which the tokens are averaged into the chosen token. Hence, the optimal resultant word template cannot be found since the optimal order in averaging the tokens cannot be determined.

The second method Liu describes is called 'Dynamic Local Averaging'. This method also requires that a token be chosen which is of "representative length". This chosen word is then averaged with other spoken words according to the distances between frames within the words. Frames from words with minimum corresponding frame distances are averaged together to generate the representative word template. Accordingly, this method chooses a token, and then averages it with other tokens along a path in time, but not necessarily along a global time alignment path to produce the optimal alignment.

The last method Liu describes, 'Linear Averaging', requires choosing a 'common length' and linearly changing the time axis of each token to that common length. The tokens are then averaged vertically, according to aligned frames. This technique may not generate a very representative word template.

Notwithstanding the peculiarities of these prior art word template generation methods, each method requires an initial storage of all original tokens. Since most speech recognition systems are memory limited, it is usually desirable that any spare memory be used for vocabulary storage. This additional memory requirement of the above discussed methods only further burdens the speech recognition system.

When a user is training the speech recognition system, the tokens are meant to each be representative of the word as spoken by the user. Each token should have an equal contribution to the generated word template, unless of course, one token happens to be entirely different from the others. In summary, the desired results for a word template generation method is one which produces a final word template with the following results:

The final word template should have an averaged time axis such that each token equally contributes to the final word template;

When the average length of all the tokens is fractional, the generated word template will have a length which is rounded off to the closest number of frames;

As the number of tokens used in the averaging process increases, each additional token should have a reduced effect on the word template being generated as a whole;

The memory required for generating the word template should be a minimum; and

The generated word template is independent of the order in which the tokens are averaged.

SUMMARY OF THE INVENTION

In practicing the present invention, provided is a method and system for generating a final word template in a speech recognition system where speech is represented by data in frames of equal time intervals. The invention includes forming an interim template representative of at least one token, generating a time alignment path between the interim template and an additional token, mapping frames from the interim template and the token along the time alignment path onto an an averaged axis, and combining data associated with the mapped frames to produce composite frames representative of the final word template.

An additional aspect of the invention includes weighting the data representing the interim template proportional to the number of tokens the interim template represents.

DETAILED DESCRIPTION OF THE DRAWINGS

Figure 1:
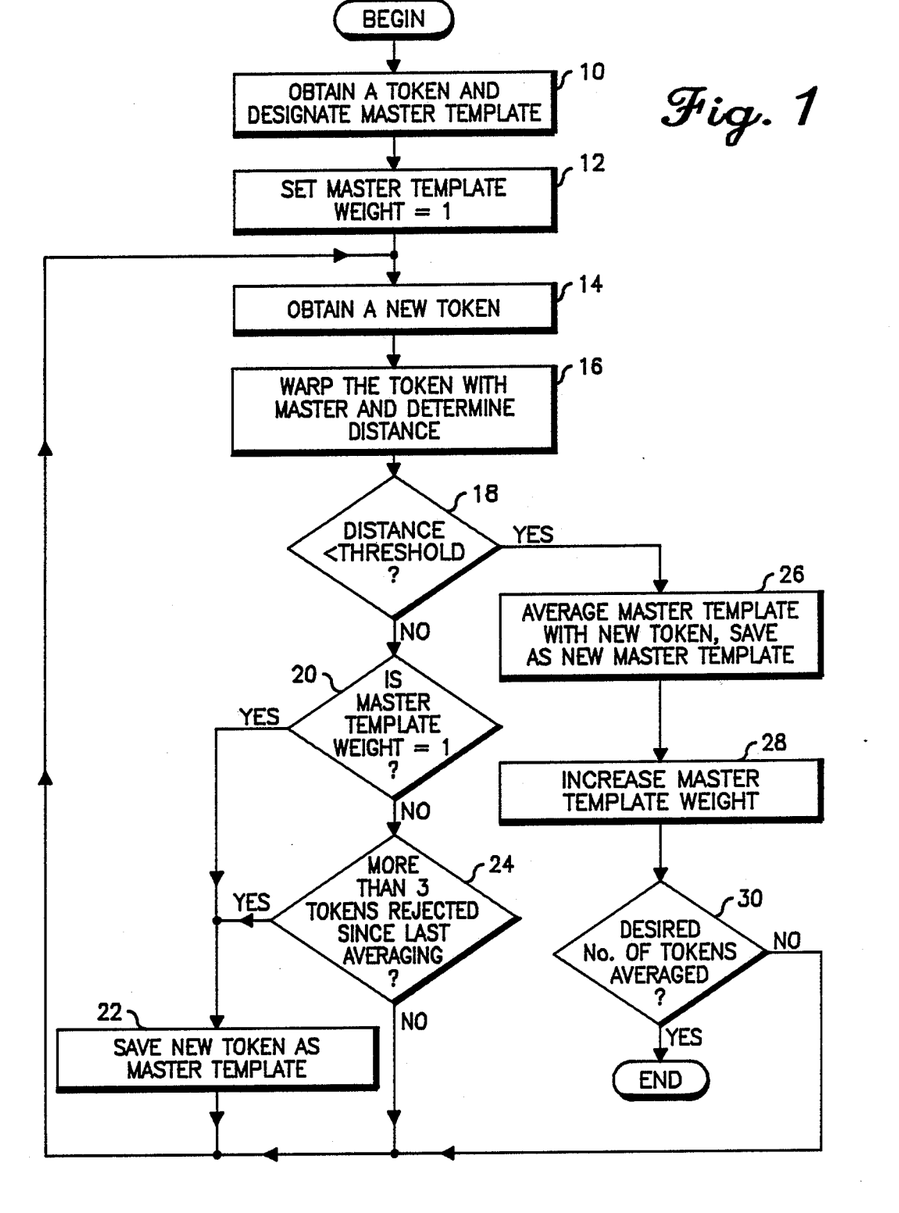
FIG. 1 is a flowchart of a speech recognition word training procedure, according to the present invention.

The flowchart of FIG. 1 depicts a general description of a training procedure which averages tokens to generate an accurate representative word template. The procedure begins by obtaining a token and designating it as the master template, block 10. The term "master template" refers to a template which may be combined with additional tokens. Accordingly, the term "interim template" is used interchangeably with "master template". The master template's data is assigned a weight equal to one, block 12, since it represents only one token. Another token is obtained, block 14, which is referred to as the new token. Only a master template and a new token are required to be stored throughout this entire procedure. For a large number of tokens, this substantially reduces the required memory allocation.

The new token is dynamically time warped with the master template and the distance between them is determined, block 16. The distance is a measure of acoustic similarity commonly generated by comparing the representative data from each.

A dynamic time warp function maps two words, which may have different lengths, of similar acoustic information, onto a distance grid. Dynamic time warping is commonly used in most speech recognition applications using word templates. Nevertheless, a discussion of the preferred warping technique follows.

The preferred dynamic time warping algorithm uses a symmetric form of local path constraints as proposed by Sakoe and Chiba in a paper entitled "Dynamic Programming Algorithm Optimization for Spoken Word Recognition", ASSP Vol. 26, No. 1 February 1978. Sakoe and Chiba describe and define the fundamentals of time-normalized distance between two words, or tokens as the case may be. An adjustment window is implemented to define local slope constraints limiting the time deviation measured between the two words. The preferred symmetric form chosen for this application has local constraints which force a diagonal move after any horizontal or vertical move on the distance grid. This is defined by the dynamic programming equation through the recurrence relation, $g(i,j)$. The constraints are:

$$g(i,j) = \min \; [g(i-1,j-2) + 2\,d(i,j-1) + d(i,j);$$
$$g(i-1,j-1) + 2\,d(i,j);$$
$$g(i-2,j-1) + 2\,d(i-1,j) + d(i,j)]$$

where $d(i,j)$ is a distance function between frame i of word 1 frame j of word 2. The recursion is initialized at $g(1,1) = 2\,d(1,1)$ and the time normalized distance is found by $g(I,J)/(I+J)$, where I and J are the lengths of words 1 and 2 respectively.

Using these local constraints, the maximum ratio of which the longest word can be warped to the shortest word is two. Due to this limited warping constraint, the global limit window used is that proposed by Paliwal, Agarwal and Sinha in a paper entitled "A Modification Over Sakoe and Chiba's Dynamic Time Warping Algorithm for Isolated Word Recognition", ICASSP, 1982, pp. 1259–1261. This allows freedom to the global limit window constraints such that the window's center is a line joining the points (1,1) and (I,J), allowing the path formed between the two words to remain within local boundaries. For each point within the global window, a pointer is used to indicate the direction to the previous point on the minimal distance path. Linking these points defines an optimal time alignment path for the two words.

From block 16, flow moves to block 18 where, a check is made to determine if the total distance between these two words is reasonable, i.e. a threshold test. If the distance between the master template and the new token is greater than a predetermined amount, then the token will not be averaged into the master template. This prevents a bad token from being considered in the averaging process along with the other tokens.

If the threshold is reached, flow moves to block 20 and a test is performed to determine if the master template represents only one token. If so, the new token replaces the master template, block 22, and the process repeats at block 14. If the master template represents more than one token, a test is performed to determine if the master template has been replaced more than three times since the last averaging, block 24. If this test results in the affirmative, flow continues at block 22 for another replacement of the master template. If the result is not in the affirmative, flow moves to block 14 for a repeat of the process using another new token. The number "three" in block 24 is chosen to prevent tokens from being averaged which are not similar to other tokens. If the distance threshold test, block 18, indicates that three or more tokens are not similar to the master template, it is very likely that the master template is not representative of the spoken word.

If the distance threshold test, block 18, indicates a similarity between the new token and the master template, flow moves to block 26 where the new token is averaged with the master template. The result in averaging the master template with the new token is a new master template. Details of this block are subsequently discussed with FIG. 4.

The weight assigned to the master template is incremented at block 28, since the master template now represents another token.

A test is performed at block 30 to determine if the desired number of tokens have been averaged. If not, another token is obtained, block 14, and the process repeats until the desired number of tokens is represented by the master template.

Figure 2A:
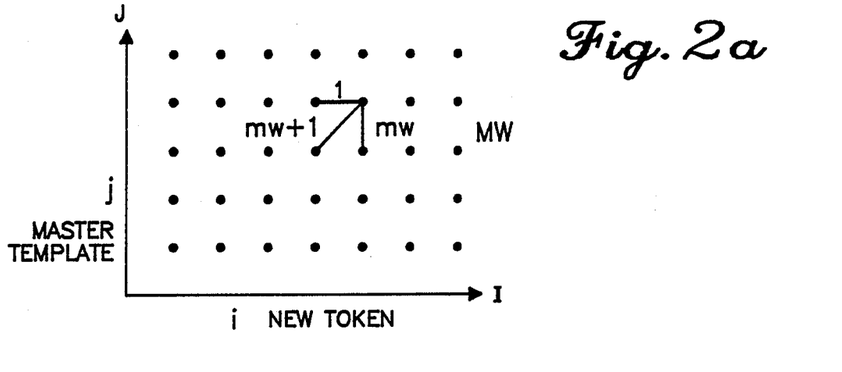
FIG. 2a, 2b and 2c are sequence of vector diagrams displaying directional weighting for a time alignment path, according to the present invention.

Referring now to FIG. 2(a), shown is a vector diagram where a new token, with frames designated by 'i', is plotted against a master template, with frames designated by 'j', on a distance grid. Dynamic time warping is used to optimally align frames 'i' to frames 'j'. The horizontal vector, labeled 1, defines a weight of magnitude 1 when the path which aligns the two words travels horizontally. The vertical vector, labeled mw, indicates the master weight and carries a weight of "mw" whenever the path travels vertically. Likewise, the diagonal vector, mw+1, carries a weight of ("mw"+1)

whenever the path travels diagonally. These weight assignments are used in the averaging procedure, block 18 of FIG. 1, for combining the new token to the master template.

Figure 2B:
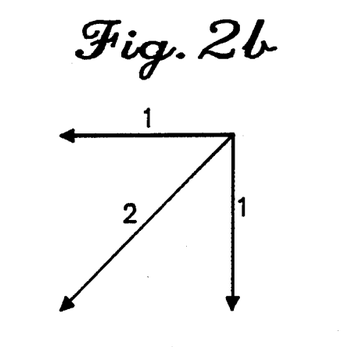

FIG. 2(b) shows an example of weighting in which mw=1, the horizontal weight is 1 and the diagonal weight is 2. This weighting example indicates that the master template is comprised of only one token, i.e. there has not yet been an averaging to combine two tokens. After the first two tokens are combined the master weight is 2 due to the newly formed master template. After a third token is combined with the first two, the master weight becomes 3.

Figure 2C:
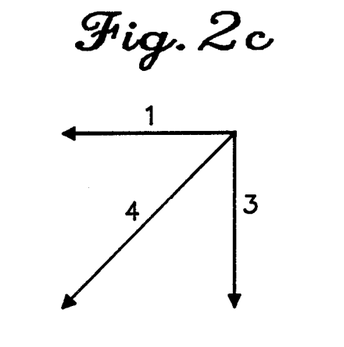

FIG. 2(c) shows a vector diagram in which mw=3. The diagonal move is (mw+1), or 4. As an increasing number of tokens are averaged into the master template, each new token has less effect on the master template. In fact, as the number of tokens combined in the master template increases, the token being averaged has less effect on the length of the master template and also on the features, or representative data, which make-up the master template.

Figure 3:
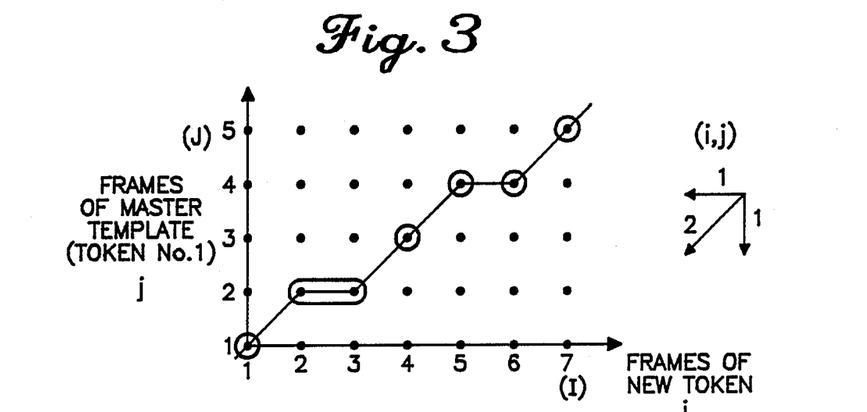
FIG. 3 is a graph showing an example of a token being combined with a master template, according to the present invention.

FIG. 3 shows a graph in which two words are time aligned according to the dynamic time warping algorithm previously discussed. The frames of the new token are plotted along the horizontal time axis, and the frames of the master template are plotted along the vertical time axis. The line in the graph represents the path of minimal distance between these two words, calculated by the recurrence relation, $g(i,j)$. Each circle along the line defines at least one frame from the new token which will be averaged with at least one frame from the master template. This example represents the case in which no tokens have previously been combined, i.e. mw=1.

The averaging procedure includes a variable known as the sum of weights, SOW. SOW is the sum of the lengths of all the tokens combined. SOW is used to accumulate the number of weighted frames as an account for when a frame is to be output. Each time a move is made to another point on the path, the weight for the direction taken is added to SOW. Since the total weight for the master template plus the new token is independent of the time alignment path, SOW from the endpoint (I,J) to the starting point (1,1) is:

$$SOW = (I-1) + mw*(J-1) \qquad \text{(equation 1)}$$

where I is the length of the new token in frames and J is the length of the master template in frames, with time axis i and j, respectively.

SOW is initialized at point (I,J) with a weight of (mw+1)/2 and updated by (mw+1)/2 at point (1,1). Using these value delimiters, the total SOW, after backtracking from end to beginning, is:

$$SOW_{total} = I + (mw*J). \qquad \text{(equation 2)}$$

This is the true sum of lengths of all averaged tokens. This can be illustrated by considering two words being combined, each with a frame length of 2. Without using the value delimiters, equation 1 results in SOW=2 since mw equals 1. This is not representative of the definition of SOW, i.e. the sum of the lengths of all the tokens combined. However, using the value delimiters, equation 2 results in $SOW_{total}=4$, the total length of this combination.

A frame is output if SOW becomes greater than or equal to the master weight. After each frame is output, SOW is normalized by subtracting the number of tokens, (mw+1). This normalization procedure produces the number of frames in the final word template which is equal to the average length of all tokens combined, or equivalently, the weighted average length of the master template and the new token.

Accordingly, the procedure begins by initializing SOW to 1 and averaging from point (7,5) of the graph of FIG. 3. The formation of an averaged frame, depicted by the circles, is defined by adding to SOW, the weight of the first move along the path. The first move is diagonal with an assigned weight of 2. SOW becomes 3. According to the present invention, a properly formed frame does not accumulate a SOW greater than or equal to (mw+1). If (mw+1) is reached by SOW, (mw+1) is subtracted from SOW and a frame is output. In this example, since SOW is greater than (mw+1), a frame at point (7,5) is output, and SOW is normalized to 1. This output frame is comprised of an average of representing data from frame 7, of the new token, and representing data from frame 5 of the master template. If mw was equal to 2 in this example, the output frame would be formed by averaging two parts of frame 5 to one part of frame 7, since each token should have an equal effect on the master template. It is noted that the feature representing the data is not restricted. It can be channel bank information, LPC parameters, line spectral pairs, etc.

To form the next frame, located at point (6,4), the horizontal move to point (5,4) must be taken. The weight assigned to this horizontal vector is accumulated to SOW. SOW becomes 2. Again, since SOW is limited to (mw+1), 2 is subtracted from SOW and SOW becomes 0. Hence, a frame is output at point (6,4).

A frame at point (5,4) is defined by traveling to (4,3) and adding the diagonal weight to SOW. SOW now becomes 2. Since SOW now equals (mw+1), no more weights can be added to SOW without exceeding its limit. A frame is output defined at point (5,4). Two is subtracted from SOW and SOW becomes 0.

Continuing along the path, the next frame is defined first by making a diagonal move to (3,2). The weight of 2 is added to SOW. SOW becomes 2. Since SOW is again at (mw+1), a frame is defined at point (4,3) and (mw+1) is subtracted from SOW. SOW again becomes 0.

The definition of the next frame is unique from the others. First the weight of the horizontal move to point (2,2) is added to SOW. SOW becomes 1. In this instance, SOW does not reach (mw+1) and another move is made. This move is the diagonal move to point (1,1), which requires a weight of 2 be added to the SOW. SOW now equals 3. Since 3 is greater than (mw+1), a frame is output defined by points (3,2) and (2,2), i.e. the output frame is defined by averaging the data represented by frames 2 and 3 from the new token and frame 2 of the master template. As after each other output frame, mw+1 is subtracted from SOW. SOW becomes 1.

The last frame defined in FIG. 3 entails updating SOW with a value of (mw+1)/2, or 1. To facilitate computation in actual practice, SOW is updated at (1,1) with the value (mw+1). This allows any partial output frames to be added into the last frame which is output, which in this case is (1,1). SOW becomes 2 with this move. Since SOW is at the (mw+1) threshold, a frame is output at point (1,1), and the averaging process is complete with the new master template defined by these 6 output frames.

This method for combining the new token with the master template is referred to as a backtracking process. This is because the averaging is done from the endpoint in time to the beginning point in time as defined by the frame sequence. The example of backtracking depicted through FIG. 3, is relatively simple. More complex examples occur when the number of frames on each axis is large and the master template consists of multiple tokens, i.e. mw is greater than 1.

Figure 4:
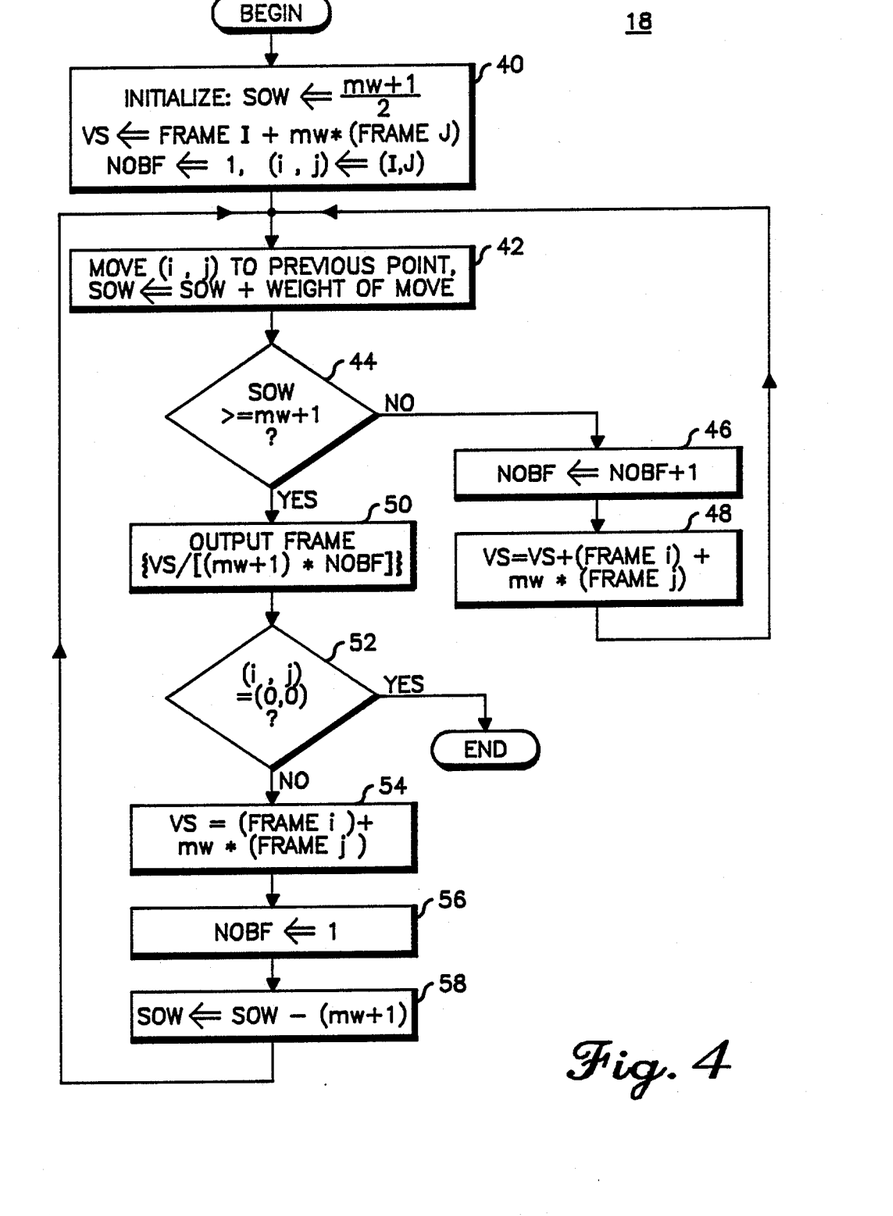
FIG. 4 is a flowchart showing, specifically, how a token is combined with a master template for averaging, according to the present invention.

FIG. 4 is a backtracking flowchart for averaging words as shown in the example of FIG. 3. It is a detailed illustration of block 26 from FIG. 1. Two key variables are used in this flowchart. They are NOBF and VS.

NOBF is a counter indicating the number of backtrack frames which are being considered for the current output frame. NOBF is reset to 1 during initialization and after each frame is output.

VS stands for vector sum and represents an accumulation of the weighted sum of the data representing the frames from the master template and the new token. It is used to accumulate the weighted frames from the master template and the new token. The feature data representing VS is normalized to generate an output frame. The normalization requires that each contributing frame be averaged according to the weight of the master template and the token. Mathematically, such averaging can be expressed as:

$$VS_{norm} = \frac{\frac{(A_1 * mw) + B_1}{(mw + 1)} + \frac{(A_2 * mw) + B_2}{(mw + 1)} + \ldots + \frac{(A_N * mw) + {}^*B_N}{(mw + 1)}}{N}$$

where $A_1, A_2, \ldots, A_N$ represent frames from the master template, and $B_1, B_2, \ldots, B_N$ represent frames from the token. Each divisional term in the numerator represents one point on the distance grid.

This expression can be simplified by factoring out $(mw+1)$ as follows: e $$VS_{norm} = \frac{(A_1 * mw) + (A_2 * mw) + \ldots + (A_N * mw) + B_1 + B_2 + \ldots + B_N}{(mw + 1) * N}$$

Since each term is generated during the backtracking process, "mw" cannot be factored out from the numerator. This is because only one frame is pointed to at a time by (i,j).

The flowchart begins by initializing SOW, as discussed; setting VS to the weighted sum of the (new token frame I)+(mw * master template frame J); setting NOBF equal to 1; and defining the first point on the time alignment path (i,j) at (I,J). This is illustrated in block 40.

Block 42 depicts a move to the next most previous point on the path, and the weight of the move accumulates into SOW. Block 44 indicates a test to determine whether or not the move caused SOW to reach the normalization factor, (mw+1). If (mw+1) is not reached, block 46 increments the number of backtrack frames, NOBF, and block 48 updates VS to accumulate the information in frames (i,j). Block 42 is returned to for another move along the path.

If mw+1 is reached by SOW, block 44, a frame is output which is defined by the points on the path which have not already been included into an output frame. The output frame is the normalized vector sum given by [VS/[(mw+1) * NOBF]], shown in block 50. After the frame is output, a test checks whether or not all the points on the path have contributed to output frames, block 52. If they have, the procedure terminates.

If all the points on the path have not contributed to an output frame, the vector sum is initialized, block 54. NOBF is reset for the next output frame, block 56, and SOW is normalized by subtracting (mw+1), block 58.

The procedure continues at block 42 with a move along the time alignment path, until all the points on the path are included in an output frame.

Accordingly, each new token is averaged into the master template by time aligning the new token with the master template using dynamic programming, and averaging the new token with the master template onto an averaged time axis using the backtracking technique shown in FIG. 4. The final result of the averaging is a word template used for comparing against user spoken words in the recognition process.

Figure 5:
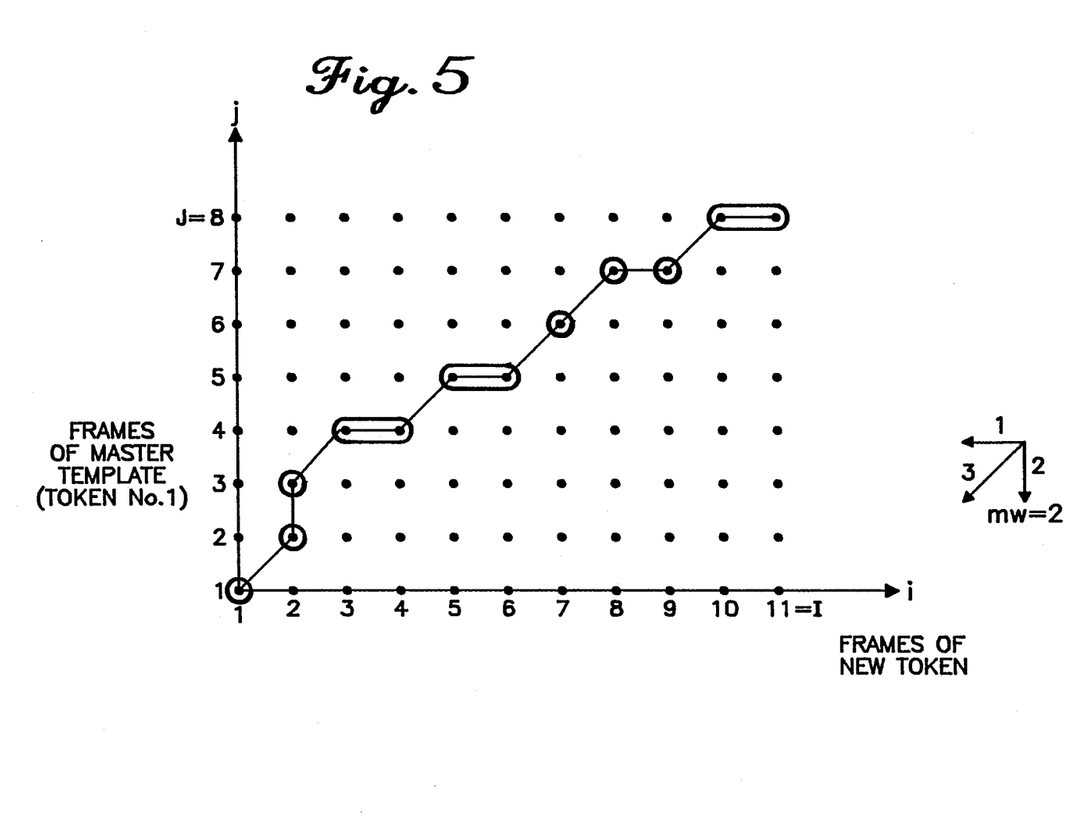
FIG. 5 is a graph, similar to the graph in FIG. 3, showing a more complex example for combining a token with a master template, according to the present invention.

FIG. 5 shows an example of this backtracking process using the flowchart in FIG. 4. The graph has weights assigned to the vectors as shown in the corresponding vector diagram. Two tokens have been averaged into the master template as seen on the vertical axis of the vector diagram. Table 1 is to be used in conjunction with the graph of FIG. 5. In Table 1 is recorded the variables used in the flowchart of FIG. 4 for averaging the two words shown on the graph of FIG. 5. On the left side of Table 1, a column indicates the corresponding block of the FIG. 4 flowchart for each variable assignment. By using this column, the example, as depicted in the graph 70 can be easily followed.

Table 1 begins at block 40 by initializing SOW, VS, NOBF and (i,j). The path is traveled along to point (10,8) and SOW is updated, block 42. Not shown in Table 1 is the test indicated by block 44, but the test decision is indicated by the NOBF update as seen in the next table entry, block 46. At this point, NOBF is incremented to 2 and VS is updated. Another move is made along the path, again indicated by block 42. Finally, since (mw+1) is reached by SOW, the first frame is output, frame #9. Blocks 54, 56 and 58 then update VS, NOBF and SOW respectively. Another move is made along the path, block 42.

The process continues until each point on the path contributes to an output frame, as was discussed with respect to the example of FIG. 3. The table can be followed in this manner for each frame which is output as circled in FIG. 5.

Figure 6:
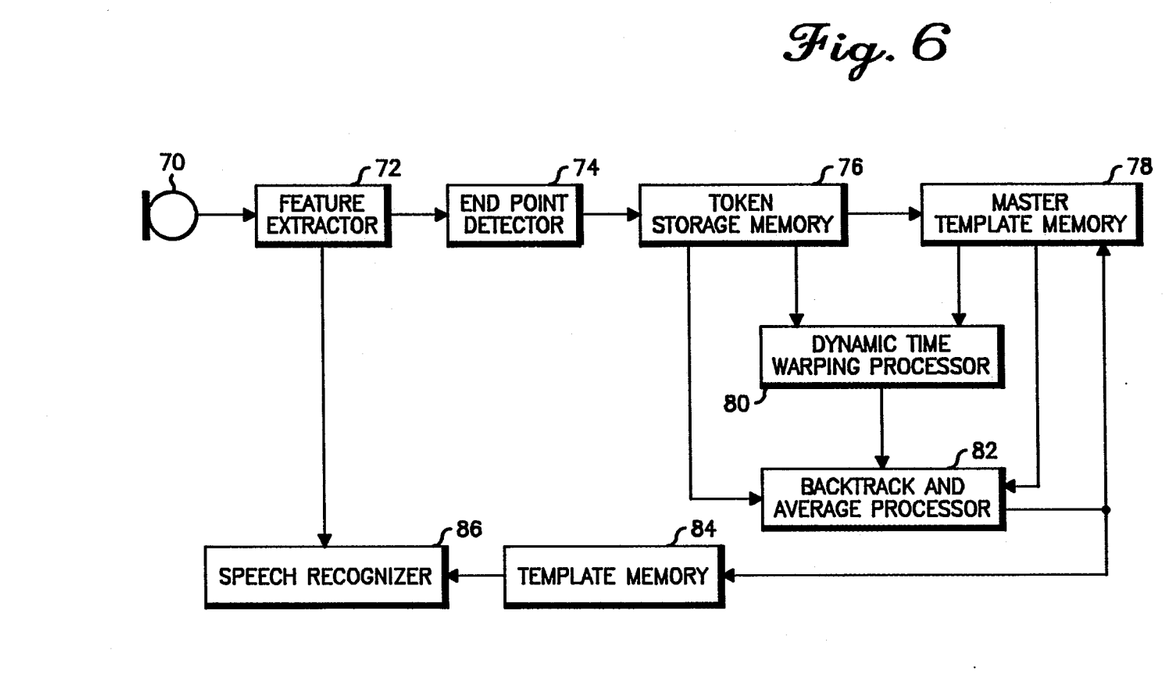
FIG. 6 is a block diagram of a speech recognition system in accordance with the present invention.

Referring now to FIG. 6, shown is a block diagram of a speech recognition system implementing the word template generation technique described herein. A microphone 70 is used to input spoken words. The analog speech is converted into digital representation using a feature extractor 72, such as the one described by G. M. White and R. B. Neely, "Speech recognition experiments with linear prediction, bandpass filtering, and dynamic programming," IEEE Trans. Acoust., Speech Signal Processing, vol. ASSP-24, pp. 183-188, April 1976.

An endpoint detector 74 is employed to define the beginning and ending of the spoken word from the representative feature data. Such an endpoint detector is described in prior art by L. F. Lamel, L. R. Rabiner, A. E. Rosenburg, and J. G. Wilpon, in a paper entitled "An improved endpoint detector for isolated word recognition," IEEE Trans. Acoust. , Speech Signal Processing, vol. ASSP-29, pp. 777–785, August 1981.

The endpoint detector 74 defines a token for storage as shown in block 76. The master template is initially defined from a single token. Thus, the endpoint detector 74 stores an initial token in memory block 78 as well. Memory blocks 76 and 78 are typically RAM.

A dynamic time warping processor 80 aligns the master template, stored in memory block 78, with the token, stored in memory block 76. A detailed description of dynamic time warping requirements is described by Sakoe and Chiba, supra. A backtracking processor 82 is be used to process the corresponding token data with the master template data according to FIG. 4. A Motorola type 6805 microprocessor can be used for this purpose. The resultant master template is stored back in master template memory, block 78.

After averaging is completed, the resultant master template is stored in template memory 84. The template memory employed can be RAM, non-volatile RAM or EEPROM.

Words are averaged in this manner until the template memory contains the appropriate vocabulary for the speech recognition process. For a detailed description of a recognizer 86, reference the paper by F. Itakura, "Minimum prediction residual principle applied to speech recognition," IEEE Trans. Acoust. , Speech, Signal Processing, vol. ASSP-23, pp. 67–72, February 1975.

Accordingly, by using a template generation method as described herein, a very accurate word template can be generated and utilized in a speech recognition system. The generated word template is not only highly reliable for use in the recognition process, but it is equally representative of each word spoken during word training.

TABLE 1

| BLOCK | SOW | (i,j) | NOBF | OUTPUT FRAME |
|---|---|---|---|---|
| 40 | 1½ | (11,8) | 1 | |
| 42 | 2½ | (10,8) | | |
| 46 | | | 2 | |
| 48 | | | | |
| 42 | 5½ | (9,7) | | |
| 50 | | | | #9: (11,8), (10,8) = VS/2(2 + 1) |
| 54,56,58 | 2½ | | 1 | |
| 42 | 3½ | (8,7) | | |
| 50 | | | | #8: (9,7) = VS/(2 + 1) |
| 54,56,58 | ½ | | 1 | |
| 42 | 3½ | (7,6) | | |
| 50 | | | | #7: (8,7) = VS/(2 + 1) |
| 54,56,58 | ½ | | 1 | |
| 42 | 3½ | (6,5) | | |
| 50 | | | | #6: (7,6) = VS/(2 + 1) |
| 54,56,58 | ½ | | 1 | |
| 42 | 1½ | (5,5) | | |
| 46 | | | 2 | |
| 48 | | | | |
| 42 | 4½ | (4,4) | | |
| 50 | | | | #5: (6,5),(5,5) = VS/2(2 + 1) |
| 54,56,58 | 1½ | | 1 | |
| 42 | 2½ | (3,4) | | |
| 46 | | | 2 | |
| 48 | | | | |
| 42 | 5½ | (2,3) | | |
| 50 | | | | #4: (4,4),(3,4) = VS/2(2 + 1) |
| 54,56,58 | 2½ | | 1 | |
| 42 | 4½ | (2,2) | | |
| 50 | | | | #3: (2,3) = VS/(2 + 1) |

TABLE 1-continued

| BLOCK | SOW | (i,j) | NOBF | OUTPUT FRAME |
|---|---|---|---|---|
| 54,56,58 | 1½ | | 1 | |
| 42 | 4½ | (1,1) | | |
| 50 | | | | #2: (2,2) = VS/(2 + 1) |
| 54,56,58 | 1½ | | 1 | |
| 42 | 4½* | (0,0) | | |
| 50 | | | | #1: (1,1) = VS/(2 + 1) |

*(mw + 1) is added for the last diagonal move to allow any partial frames to be rounded into the frame at (1,1).

What is claimed is:

1. In a speech recognition system, wherein speech is represented by data in frames of equal time intervals, a method for generating a final word template from a plurality of tokens, comprising the steps of:
    (a) forming an interim template representative of at least one token;
    (b) generating a time alignment path between said interim template and an additional token;
    (c) mapping frames from said interim template and said additional token along said time alignment path onto an averaged time axis; and
    (d) combining data associated with said mapped frames to produce composite frames representative of the final word template.

2. A method for generating a final word template, according to claim 1, wherein forming said interim template includes the steps of:
    generating a time alignment path between a first and second token;
    mapping frames from said first and second token along said time alignment path onto an averaged time axis; and
    combining data associated with said mapped frames to produce composite frames representative of the interim template.

3. A method for generating a final word template, according to claim 1, wherein combining data comprises averaging the data such that the resultant data is approximately equally contributed to by each token the final template represents.

4. A method for generating a final word template, according to claim 1, including the steps of comparing the data between the interim template and the additional token to produce a distance measure, and comparing said distance measure to a predetermined distance measure.

5. A method for generating a final word template, according to claim 1, including the step of weighting the data representing said interim template.

6. A method for generating a final word template, according to claim 1, including the step of repetitively averaging data representing tokens with data representing said interim template.

7. A method for generating a final word template, according to claim 1, including the step of accumulating values assigned to the direction taken along said time alignment path to produce said composite frames.

8. A method for generating a final word template, according to claim 1, wherein said combining includes the step of accumulating the data representing said interim template and the data representing said additional token.

9. A method for generating a final word template, according to claim 1, including the step of normalizing a sum of accumulated data to produce said composite frames.

10. In a speech recognition system, wherein speech is represented by data in frames of equal time intervals, a method for generating a final word template from a plurality of tokens, comprising the steps of:
- (a) forming an interim template representative of at least one token;
- (b) generating a time alignment path between said interim template and an additional token;
- (c) weighting the data representing said interim template proportional to the number of tokens said interim template represents; and
- (d) combining frames from said interim template with frames from said additional token, dependent upon the number of tokens which the interim template represents, to produce output frames representative of the final word template.

11. A method for generating a final word template, according to claim 10, including the step of mapping frames from said interim template and said token along said time alignment path onto an averaged time axis.

12. A method for generating a final word template, according to claim 10, wherein forming said interim template includes the steps of generating a time alignment path between a first and second token;

mapping frames from said first and second token along said time alignment path onto an averaged time axis; and combining data associated with said mapped frames to produce composite frames representative of the interim template.

13. A method for generating a final word template, according to claim 10, including the steps of comparing the data between the interim template and the additional token to produce a distance measure and comparing said distance measure to a predetermined distance measure.

14. A method for generating a final word template, according to claim 10, wherein said interim template includes an approximately equal contribution of data from each token said interim template represents.

15. A method for generating a final word template according to claim 10, wherein weighting the data representing said interim template includes the step of assigning at least one value to each direction taken along said time alignment path.

16. A method for generating a final word template, according to claim 10, wherein said combining includes the step of accumulating the weighted data representing said interim template and the data representing said additional token.

17. A method for generating a final word template, according to claim 10, including the step of normalizing a sum of accumulated data representing averaged frames.

18. In a speech recognition system, wherein speech is represented by data in frames of equal time intervals, an arrangement for generating a final word template from a plurality of tokens, including:
- (a) means for forming an interim template representative of at least one token;
- (b) means for generating a time alignment path between said interim template and an additional token;
- (c) means for mapping frames from said interim template and said additional token along said time alignment path onto an averaged time axis; and
- (d) means for combining data associated with said mapped frames to produce composite frames representative of a final word template.

19. An arrangement, according to claim 18, further comprising means for normalizing an accumulation of combined data to form said composite frames.

20. An arrangement, according to claim 18, including means for comparing the data between the interim template and the additional token to produce a distance measure, and means for comparing said distance measure to a predetermined distance measure.

21. An arrangement, according to claim 18, wherein said interim template includes an approximately equal contribution of data from each token said interim template represents.

22. An arrangement, according to claim 18, including means for weighting the data representing said interim template.

23. An arrangement, according to claim 18, including means for repetitively averaging data representing tokens with data representing said interim template.

24. In a speech recognition system, wherein speech is represented by data in frames of equal time intervals, an arrangement for generating a final word template from a plurality of tokens, including:
- (a) means for forming an interim template representative of at least one token;
- (b) means for generating a time alignment path between said interim template and an additional token;
- (c) means for weighting the data representing said interim template proportional to the number of tokens said interim template represents; and
- (d) means for combining frames from said interim template with frames from said additional token, dependent upon the number of tokens which the interim template represents, to produce output frames representative of the final word template.

25. An arrangement, according to claim 24, further comprising means for normalizing an accumulation of combined data to form said composite frames.

26. An arrangement, according to claim 24, including means for comparing the data between the interim template and the additional token to produce a distance measure and means for comparing said distance measure to a predetermined distance measure.

27. An arrangement, according to claim 24, wherein said interim template includes an approximately equal contribution of data from each token said interim template represents.

28. An arrangement, according to claim 24, including means for mapping frames from said interim template and said additional token along said time alignment path onto an averaged time axis.

29. An arrangement, according to claim 24, including means for repetitively averaging data representing tokens with data representing said interim template.

* * * * *